United States Patent [19]
Malec

[11] 3,774,847
[45] Nov. 27, 1973

[54] ASPIRATOR NOZZLE FOR BLOW GUNS OR THE LIKE

[76] Inventor: Jerry P. Malec, 7057 Maple, Omaha, Nebr.

[22] Filed: Jan. 17, 1972

[21] Appl. No.: 218,432

[52] U.S. Cl.................. 239/124, 239/429, 239/586
[51] Int. Cl.............................................. B05b 7/08
[58] Field of Search................ 239/124, 126, 288.3, 239/417.3, 498, 525, 556, 429, 586

[56] References Cited
UNITED STATES PATENTS

| | | | |
|---|---|---|---|
| 3,129,892 | 4/1964 | Tillman............................ | 239/417.3 |
| 3,263,934 | 8/1966 | Hope, Jr. et al.................... | 239/556 |
| 3,599,876 | 8/1971 | Kyburg............................ | 239/498 X |
| 3,647,142 | 3/1972 | Drude et al...................... | 239/288.3 |

FOREIGN PATENTS OR APPLICATIONS

| | | | |
|---|---|---|---|
| 885,892 | 11/1971 | Canada............................. | 239/525 |

*Primary Examiner*—M. Henson Wood, Jr.
*Assistant Examiner*—A. Kashnikow
*Attorney*—Zarley, McKee & Thomte

[57] ABSTRACT

An aspirator nozzle for a blow gun is disclosed herein. The nozzle includes an air passageway extending from the inlet end to the outlet end thereof. The nozzle also includes an aspirator bore which extends through the nozzle transversely to the air passageway and which communicates therewith. The preferred embodiment utilizes a single aspirator bore which extends completely through the nozzle transversely to the air passageway. A modified form of the nozzle utilizes a plurality of aspirator bores which extend radially outwardly and rearwardly from the air passageway. In both of the embodiments, the aspirator bore communicates with the air passageway at the location wherein the air flow has the greatest velocity as it passes through the nozzle. The nozzle may be used with a blow gun having a pressure regulated, manually operated valving. The nozzle may also be used with a blow gun having a poppet type, manually operated valve means. In the latter environment, an air restrictor means is placed in the blow gun between the valve means and the nozzle.

9 Claims, 5 Drawing Figures

ASPIRATOR NOZZLE FOR BLOW GUNS OR THE LIKE

This invention relates to duster or blow guns which are used for cleaning, dusting or drying in industrial environments. The gun is essentially a valve that is hand actuated and which is attached to a compressed air line. The valve body has a nozzle or orifice commonly used to direct the air in a usable coherent pattern somewhat like cone projecting from the nozzle end or orifice end of the gun.

Recent federal and state laws are now in effect which regulate the use of the blow guns described above. The federal regulations provide that an acceptable gun for use must not provide more than thirty P.S.I. static pressure at its nozzle or outlet orifice when the air discharge nozzle is blocked. Additionally, the noise made by the discharge of the acceptable gun when being used must not exceed 85 Decibels when tested under certain prescribed conditions.

A great many blow guns have been newly constructed and a great number of old guns have been modified in an attempt to meet the federal requirements. The most common modification is a change in the nozzle design of the guns which permits the nozzle configuration to pick up additional air at atmospheric pressure by the positioning of the high pressure gun discharge orifice in a screened or guarded tube or shield. This effectively places the high pressure discharge port away from the possibility of being blocked, even on purpose, and allows the screen or guard to discharge air rearwardly if the front of the tube or safety nozzle is blocked.

There have also been attempts to incorporate a small (usually piston type) regulator in the handle of the blow gun replacing the usual poppet valve mechanism and safety nozzle. The regulator is used to regulate the discharged air to a conventional single orifice discharge port to 30 P.S.I. Almost all of these safety guns of all types are commonly rated at 100 P.S.I. input air pressure. Normally the static pressure of a block nozzle, when the input reaches 150 P.S.I. allows a higher than 30 P.S.I. output pressure. This is prevalent even with the auxiliary nozzle or safety nozzle utilized on most guns that claim compliance with the federal regulations.

Universally the new safety guns that allegedly meet the new Federal regulations have one common failing. The guns either diffuse the air stream too much for effective pinpoint cleaning with the air jet or if the gun is a single orifice type with the regulator, the volume of air is too low for effective usage.

Normally before the passage of Federal laws restricting their usage, blow guns universally embodied a single handle with a poppet valve button or lever which actuated discharging air through a single orifice. This orifice was most commonly made in a separate tip or part that was screwed into the discharge port of the blow gun handle or body. In attempting to comply with Federal laws, many auxiliary nozzles have been provided but the auxiliary nozzles not only reduce the efficiency of the gun but also substantially increase the cost of the gun.

Therefore, it is a principal object of this invention to provide an improved nozzle for a blow gun or the like.

A further object of this invention is to provide an improved nozzle having an aspirator passageway provided therein which permits the blow gun to meet Federal requirements.

A further object of this invention is to provide an improved aspirator nozzle which does not substantially increase the cost of the blow gun.

A further object of this invention is to provide an aspirator nozzle which may be used in conjunction with a restrictor means which is mounted in a blow gun having a poppet type, manually operated valve means.

A further object of this invention is to provide an improved aspirator nozzle including an aspirator port which communicates with the air passageway in the nozzle at the point in which the air is traveling at the greatest velocity through the nozzle.

A further object of this invention is to provide an aspirator nozzle which may be used with blow guns having a pressure regulated, manually operated valve means thereon.

A still further object of this invention is to provide a nozzle which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figure 1:
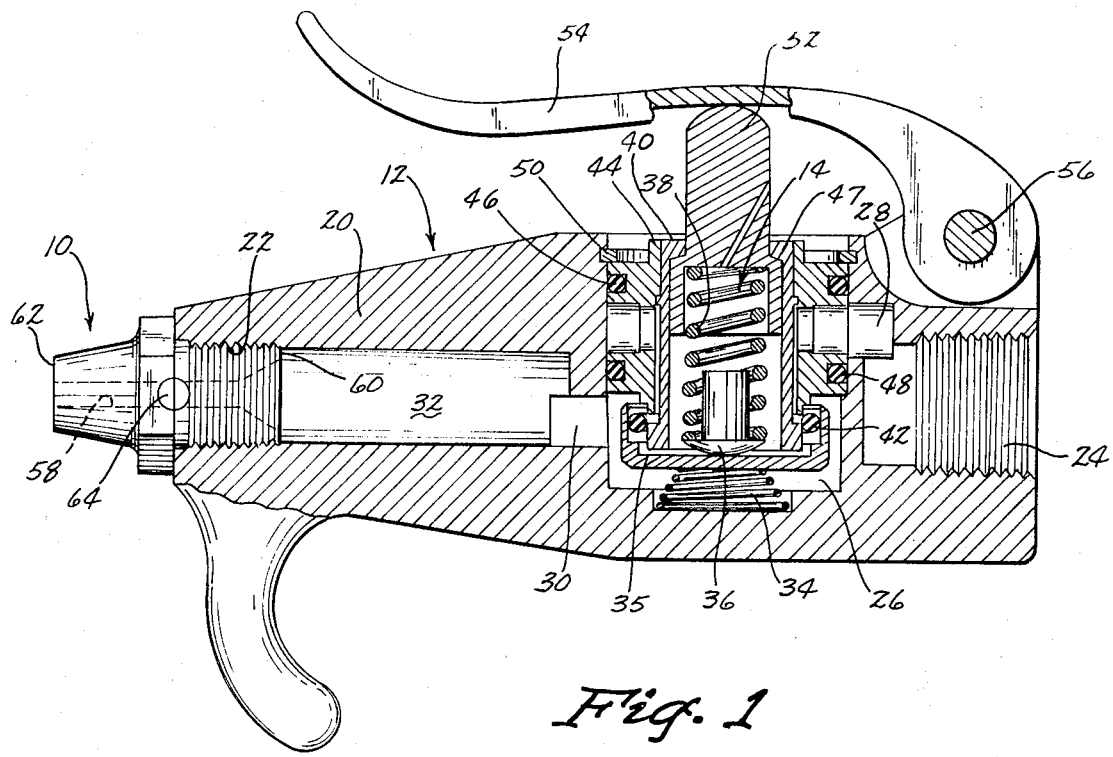
FIG. 1 is a sectional view of a blow gun utilizing the nozzle of this invention.

The aspirator nozzle of this invention is generally designated by the reference numeral 10. The numeral 12 refers to a blow gun having a pressure regulated, manually controlled valve means 14. The numeral 16 refers to a blow gun having a manually operated valve means 18 of the poppet type.

Blow gun 12 includes a body 20 having internally threaded discharge and inlet ends 22 and 24 respectively. As seen in the drawings, nozzle 10 is threadably received by the discharge end 22. Inlet end 24 is adapted to be connected to a suitable air line or conduit connected to a source of air pressure.

Valve chamber 26 extends downwardly into body 20 as seen in FIG. 1. Opening 28 provides communication between inlet end 24 and chamber 26 while opening 30 provides communication between passageway 32 and chamber 26. Passageway 32 communicates with discharge end 22 as viewed in FIG. 1. The pressure regulated valve means 14 is of the rolling "O" ring type such as that disclosed in U.S. Pat. No. 3,586,291 which issued June 22, 1971. The valve 14 generally includes return spring 34, valve 35, rivet 36, mainspring 38, spring guide 40, valve "O" ring 42, cartridge 44, cartridge seals 46 and 48, retainer ring 50 and button 52. Lever 54 is pivotally connected to gun body 20 at 56 and is adapted to depress button 52, uopon being depressed itself, to permit the flow of air from inlet end 24 to passageway 32.

Figures 2, 3:
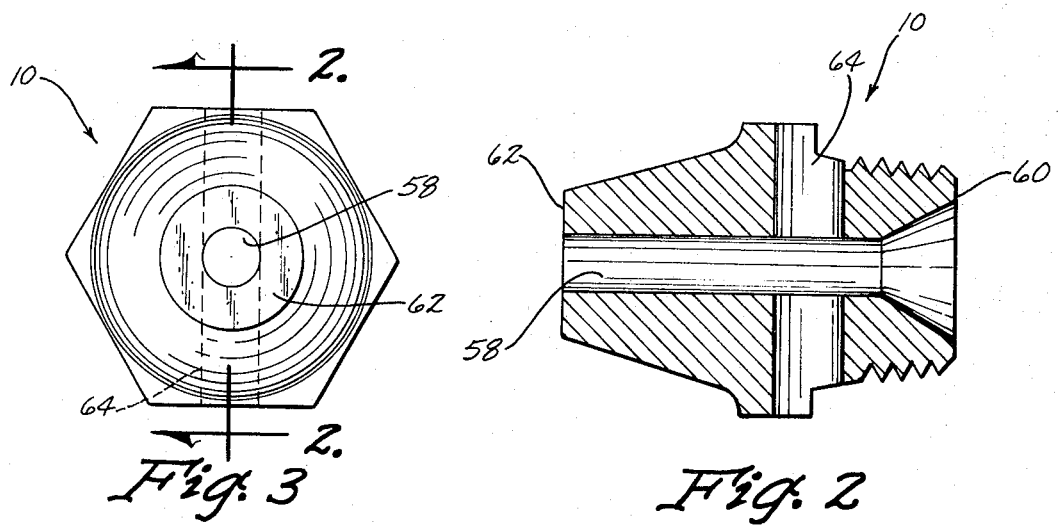
FIG. 2 is a cross section of the nozzle.
FIG. 3 is a front elevational view of the nozzle.

Nozzle 10 has an air passageway or bore 58 extending from its rearward or inlet end 60 to its forward or discharge end 62. As seen in FIG. 2, the rearward end of bore 58 is tapered or flared outwardly. Nozzle 10 also has an aspirator bore or passageway 64 formed therein which extends completely through the nozzle transversely to the bore 58. Preferably, the diameter of bore 64 should be greater than the diameter of bore 58 to achieve the most satisfactory results. It is important that the bore 64 communicate with the bore 58 at the most reduced diameter of the bore so that the aspirator bore 64 communicates with the bore 58 at the point of the greatest air velocity therethrough.

Figure 4:
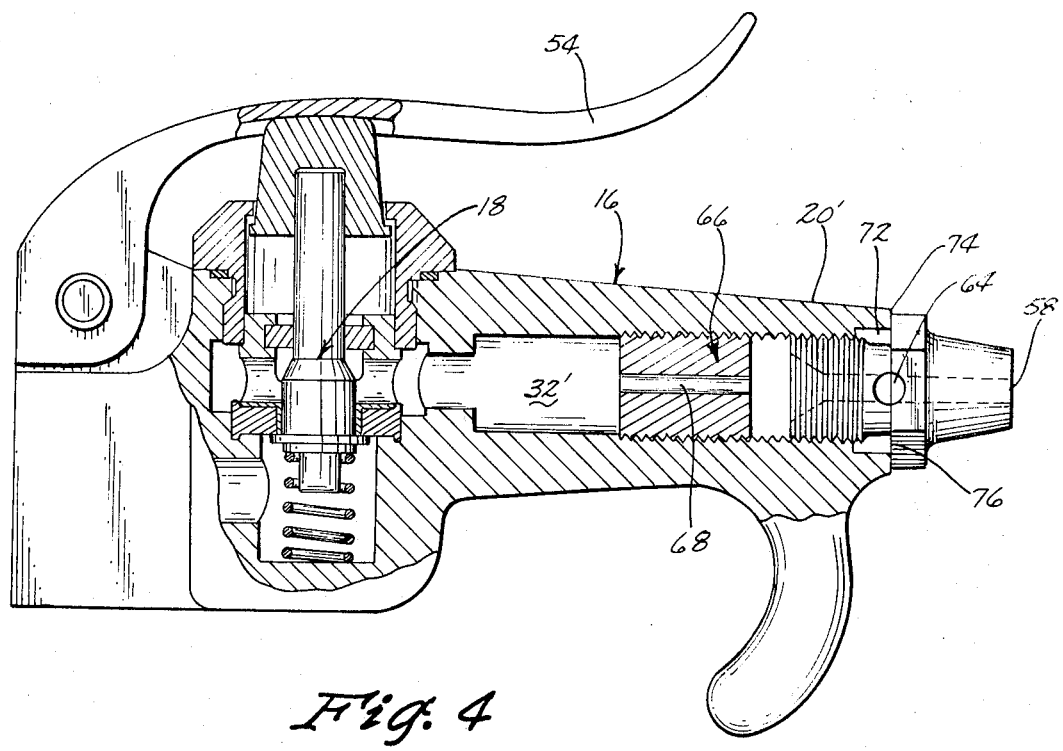
FIG. 4 is a view similar to FIG. 1 except that the blow gun utilizes a poppet valve assembly.

The blow gun 16 is essentially the same as blow gun 12 except that the poppet valve assembly is utilized rather than the pressure regulated valve used in blow gun 12. When the nozzle 10 is being used on a blow gun such as illustrated in FIG. 4, it is necessary to insert an air restrictor means 66 in passageway 32'. Air restrictor means 66 is removably inserted into passageway 32' and has an air passageway bore 68 extending therethrough. Bore 68 has a diameter which is substantially smaller than the diameter of passageway 32'.

With respect to the blow gun 16, the normal method of modification and operation is as follows. The nozzle 10 is removed from the gun body 20' and a secondary orifice (restrictor means 66) is introduced into the passageway 32 between the nozzle 10 and the poppet valve used to control the air. The air restrictor means 66 effectively reduces the amount of air available at the tip from the previous unrestricted passage. The passageway 64 is then drilled or milled in the nozzle 10 at right angles to the passageway 58. The position of the passageway 64 must be carefully positioned in the nozzle so that it crosses the passageway 58 at somewhere in its reduced area. If not properly positioned, the cross hole or passageway 64 merely adds to the air which is lost and does not add to the effectiveness of the gun. A normally non-complying blow gun when modified as just described may be operated at 150 P. S. I. and will normally read the full line pressure or 150 P.S.I. when engaged at the nozzle end when the nozzle is blocked so that the gun does comply with the Federal regulations. When the blow gun valve device is actuated, the nozzle discharges air at a lesser velocity and noise level than an unmodified unit. Virtually all of the air (approximately 95 percent) is still discharged through the normal discharge end of the nozzle. No appreciable amount of air escapes from the passageway 64 during normal gun operation. This is due to the increased velocity of the outwardly passing air as it passes through the discharge orifice and the "Coanda" effect of the airstream as it passes through the discharge orifice.

When the discharge end of the nozzle is blocked, the passageway 64 becomes a discharge port and the air escapes outwardly at right angles from the blocked nozzle tip thereby complying with Federal regulations.

With most of the air available in a coherent small pattern and the noise level reduced by the internal restrictor orifice thereby reducing the air passage to a lower point, the cross drilled nozzle meets Federal specifications. The nozzle provides a blocked discharge port pressure of 30 P.S.I. and does not waste or diffuse the air consumed or discharged by the blow gun device. The passageway 64 may be of any cross-sectional configuration but the preferred cross-sectional configuration is circular. A further important feature in the cross drilled passageway 64 is that the proper positioning of the same permits just enough air to escape through the passageway 64 during normal gun operation to keep the passageway 64 free of grease, paint, dirt, etc. that will build up in other design orifices or auxiliary air screens or nozzle devices.

It can readily be seen by the simple addition of an aspirator port in an already existing nozzle and a restrictor means pressed or screwed into the passageway 32', non-complying guns may be modified so as to comply with the Federal regulations. This modification permits practically all existing guns to be modified so as to meet Federal requirements.

The gun 12 operates in substantially the same manner as the blow gun 16 except that a restrictor means is not needed in passageway 32 due to the utilization of the pressure regulated valve means. The nozzle 10 functions in the same manner as the nozzle on the gun 16.

Figure 5:
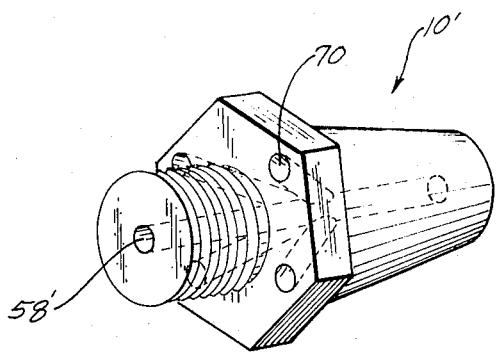
FIG. 5 is a perspective view of a modified form of the nozzle.

FIG. 5 illustrates a modified form of the nozzle 10 which is designated by the reference numeral 10'. Nozzle 10' has a passageway 58' (identical to passageway 58) extending therethrough. A plurality of radially extending aspirator ports 70 extend outwardly from bore 58' to communicate with the atmosphere. It is preferred that the ports 70 be disposed transversely with respect to the passageway 58' but they may extend radially outwardly and rearwardly as seen in FIG. 5. Preferably, the ports 70 have a cumulative diameter greater than the diameter of passageway 58'.

It should be noted that FIG. 4 illustrates a modification of the forward end of the guns. The gun 16 (or gun 12) is modified to provide a counterbore 72 which communicates with passageway 32'. A pair of slots 74 and 76 are also formed in the end of the gun 16 to provide atmospheric communication for the counterbore 72. The counterbore 72 and slots 74 and 76 aid in exhausting the air to the atmosphere if the discharge end of bore 58 is blocked.

FIG. 2 also illustrates that the bore 64 is formed in the nozzle at the juncture of the hex portion and the threaded portion of the nozzle. Such a configuration provides an additional safety feature for the nozzle since it is extremely difficult for the outer ends of the bore 64 to be intentionally plugged due to the unusual configuration thereof.

In each of the nozzle embodiments, the aspirator passageway or ports communicate with the primary nozzle passageway at the point of greatest air velocity passing therethrough. The nozzles of this invention permit new as well as existing blow guns to comply with the new Federal specifications and regulations regarding blow guns. The blow guns will not exceed the prescribed air pressure when the nozzle tips or discharge openings of the nozzles are blocked since the air pressure in the gun will be aspirated through the aspirator passageway or ports. Thus it can be seen that the invention accomplishes at least all of its stated objectives.

I claim:
1. An aspirator nozzle comprising,
    said nozzle having a forward end, and a rearward end adapted to be secured to the discharge end of an air gun body, said nozzle having an air passageway formed therein extending therethrough from its rearward end to its forward end defining an inlet opening and a discharge opening, said nozzle having an aspirator passageway means formed therein between the rearward and forward ends thereof which communicates with said air passageway and which provides communication between said air passageway and the atmosphere, said aspirator passageway communicating with said air passageway at the point of greatest air velocity.

2. The nozzle of claim 1 wherein the diameter of said air passageway rearwardly of said aspirator passageway is equal to the diameter of said air passageway forwardly of said aspirator passageway.

3. An aspirator nozzle comprising, said nozzle having a forward end, and a rearward end adapted to be secured to the discharge end of an air gun body, said nozzle having an air passageway formed therein extending therethrough from its rearward end to its forward end defining an inlet opening and a discharge opening, said nozzle having an aspirator passageway means formed therein between the rearward and forward ends thereof which communicates with said air passageway and which provides communication between said air passageway and the atmosphere, said aspirator passageway having a diameter greater than the diameter of said air passageway.

4. In combination, a blow gun body having first and second ends with an inlet opening at said first end and a discharge opening at said second end, said inlet opening being in communication with a source of air under pressure, said gun body having a valve chamber formed therein between said first and second ends, said gun body having a first air passageway means extending between said inlet opening and said valve chamber, said gun body having a second air passageway means extending between said discharge opening and said valve chamber, a manually operable valve means in said valve chamber for permitting the selective flow of air from said first air passageway means to said second air passageway means, and an aspirator nozzle operatively secured to said gun body at said second end, said nozzle having an inlet opening in communication with said second air passageway means, said nozzle having an air discharge opening, said nozzle having a first elongated bore extending therethrough between its inlet and discharge openings whereby air under pressure will normally be discharged from said discharge opening when said valve means is opened, said nozzle having an aspirator passageway means formed therein between said inlet and outlet openings which communicates with said first bore and the atmosphere, said aspirator passageway means being transversely disposed with respect to said first bore, said aspirator passageway means comprises a single elongated bore extending completely through said nozzle, the diameter of said single elongated bore having a diameter greater than the diameter of said first elongated bore.

5. In combination, a blow gun body having first and second ends with an inlet opening at said first end and a discharge opening at said second end, said inlet opening being in communication with a source of air under pressure, said gun body having a valve chamber formed therein between said first and second ends, said gun body having a first air passageway means extending between said inlet opening and said valve chamber, said gun body having a second air passageway means extending between said discharge opening and said valve chamber, a manually operable valve means in said valve chamber for permitting the selective flow of air from said first air passageway means to said second air passageway means, an aspirator nozzle operatively secured to said gun body at said second end, said nozzle having an inlet opening in communication with said second air passageway means, said nozzle having an air discharge opening, said nozzle having a first elongated bore extending therethrough between its inlet and discharge openings whereby air under pressure will normally be discharged from said discharge opening when said valve means is opened, said nozzle having an aspirator passageway means formed therein between said inlet and outlet openings which communicates with said first bore and the atmosphere, said aspirator passageway means being transversely disposed with respect to said first bore, said aspirator passageway means comprises a single elongated bore extending completely through said nozzle, said nozzle having a hexagonal portion and a reduced diameter threaded portion extending therefrom, said single elongated bore being positioned at the juncture of said hexagonal portion and said threaded portion.

6. In combination, a blow gun body having first and second ends with an inlet opening at said first end and a discharge opening at said second end, said inlet opening being in communication with a source of air under pressure, said gun body having a valve chamber formed therein between said first and second ends, said gun body having a first air passageway means extending between said inlet opening and said valve chamber, said gun body having a second air passageway means extending between said discharge opening and said valve chamber, a manually operable valve means in said valve chamber for permitting the selective flow of air from said first air passageway means to said second air passageway means, and an aspirator nozzle operatively secured to said gun body at said second end, said nozzle having an inlet opening in communication with said second air passageway means, said nozzle having an air discharge opening, said nozzle having a first elongated bore extending therethrough between its inlet and discharge openings whereby air under pressure will normally be discharged from said discharge opening when said valve means is opened, said nozzle having an aspirator passageway means formed therein between said inlet and outlet openings which communicates with said first bore and the atmosphere, said aspirator passageway means being transversely disposed with respect to said first bore, said gun having a counterbore and slot means formed at its second end.

7. In combination, a blow gun body having first and second ends with an inlet opening at said first end and a discharge opening at said second end, said inlet opening being in communication with a source of air under pressure, said gun body having a valve chamber formed therein between said first and second ends, said gun body having a first air passageway means extending between said inlet opening and said valve chamber, said gun body having a second air passageway means extending between said discharge opening and said valve chamber, a manually operable valve means in said valve chamber for permitting the selective flow of air from said first air passageway means to said second air passageway means, and an aspirator nozzle operatively secured to said gun body at said second end, said nozzle having an inlet opening in communication with said second air passageway means, said nozzle having an air discharge opening, said nozzle having a first elongated bore extending therethrough between its inlet and discharge openings whereby air under pressure will normally be discharged from said discharge opening when said valve means is opened, said nozzle having an aspirator passageway means formed therein between said inlet and outlet openings which communicates with said first bore and the atmosphere, said aspirator passageway means being transversely disposed with respect to said first bore, said aspirator passageway means comprising a single elongated bore extending completely through said nozzle, said valve means comprising a poppet valve, said second air passageway having a diameter substantially greater than said first elongated bore in said nozzle, and a restrictor means in said second air passageway, said air restrictor means having an air passageway formed therein extending therethrough which has a diameter substantially smaller than the diameter of said second air passageway.

8. The combination of claim 7 wherein said air restrictor means is removably mounted in said second air passageway.

9. In combination, a blow gun body having first and second ends with an inlet opening at said first end and a discharge opening at said second end, said inlet opening being in communication with a source of air under pressure, said gun body having a valve chamber formed therein between said first and second ends, said gun body having a first air passageway means extending between said inlet opening and said valve chamber, said gun body having a second air passageway means extending between said discharge opening and said valve chamber, a manually operable valve means in said valve chamber for permitting the selective flow of air from said first air passageway means to said second air passageway means, and an aspirator nozzle operatively secured to said gun body at said second end, said nozzle having an inlet opening in communication with said second air passageway means, said nozzle having an air discharge opening, said nozzle having a first elongated bore extending therethrough between its inlet and discharge openings whereby air under pressure will normally be discharged from said discharge opening when said valve means is opened, said nozzle having an aspirator passageway means formed therein between said inlet and outlet openings which communicates with said first bore and the atmosphere, said aspirator passageway means being transversely disposed with respect to said first bore, said aspirator passageway means comprising a single elongated bore extending completely through said nozzle, said valve means comprising a pressure regulated valve means, said pressure regulator valve means comprising a rolling O-ring type pressure regulator.

* * * * *